United States Patent
Farrell et al.

(10) Patent No.: US 11,811,929 B2
(45) Date of Patent: Nov. 7, 2023

(54) DETECTION OF COMPROMISED CREDENTIALS

(71) Applicant: International Business Machines Corporation, Armonk, NY (US)

(72) Inventors: Leo Michael Farrell, Queensland (AU); Holly Wright, Queensland (AU)

(73) Assignee: International Business Machines Corporation, Armonk, NY (US)

( * ) Notice: Subject to any disclaimer, the term of this patent is extended or adjusted under 35 U.S.C. 154(b) by 213 days.

(21) Appl. No.: 17/159,929

(22) Filed: Jan. 27, 2021

(65) Prior Publication Data

US 2022/0239484 A1    Jul. 28, 2022

(51) Int. Cl.
*H04L 29/06* (2006.01)
*H04L 9/08* (2006.01)
*H04L 9/32* (2006.01)
*H04L 67/01* (2022.01)

(52) U.S. Cl.
CPC .......... *H04L 9/3213* (2013.01); *H04L 9/0891* (2013.01); *H04L 9/3297* (2013.01); *H04L 67/01* (2022.05)

(58) Field of Classification Search
CPC ..... H04L 9/0891; H04L 9/3213; H04L 67/01; H04L 9/3297
See application file for complete search history.

(56) References Cited

U.S. PATENT DOCUMENTS

| 8,412,928 | B1 * | 4/2013 | Bowness | H04L 63/0838 |
| | | | | 713/155 |
| 8,489,740 | B2 * | 7/2013 | Schneider | H04L 63/123 |
| | | | | 709/225 |
| 9,077,707 | B2 * | 7/2015 | Vrancken | H04L 63/0807 |
| 10,162,962 | B1 | 12/2018 | Glick et al. | |
| 11,196,560 | B2 * | 12/2021 | Chengalvala | H04L 63/20 |
| 11,196,739 | B2 * | 12/2021 | Kulkarni | H04L 63/0861 |
| 11,321,455 | B2 * | 5/2022 | Goodridge | G06F 21/604 |
| 11,349,844 | B2 * | 5/2022 | Barhudarian | H04L 63/108 |
| 2014/0351911 | A1 * | 11/2014 | Yang | H04L 63/10 |
| | | | | 726/7 |

(Continued)

FOREIGN PATENT DOCUMENTS

GB    2572471 B    10/2020

OTHER PUBLICATIONS

Lodderstedt et al., "OAuth 2.0 Threat Model and Security Considerations," Internet Engineering Task Force (IETF), Jan. 2013, 72 pages. https://tools.ietf.org/html/rfc6819.

(Continued)

*Primary Examiner* — Mohammad A Siddiqi
(74) *Attorney, Agent, or Firm* — Yee & Associates, P.C.

(57) ABSTRACT

Managing client access token requests is provided. It is determined whether a current time interval between a last allowed access token request matches a regular access token request interval for a client. In response to determining that the current time interval does match the regular access token request interval for the client, a current access token request is allowed. An access token is generated for the client to access a protected resource hosted by a resource server based on allowing the current access token request. The access token is issued to the client via a network.

17 Claims, 5 Drawing Sheets

(56) References Cited

U.S. PATENT DOCUMENTS

| | | | |
|---|---|---|---|
| 2015/0077220 A1* | 3/2015 | Davis | G07C 9/00571 |
| | | | 340/5.7 |
| 2015/0082025 A1* | 3/2015 | Deshpande | H04W 12/069 |
| | | | 713/155 |
| 2017/0214712 A1 | 7/2017 | Maxwell et al. | |
| 2017/0223027 A1* | 8/2017 | Moreton | G06F 21/6245 |
| 2018/0006821 A1* | 1/2018 | Kinagi | G06Q 20/4015 |
| 2018/0007087 A1 | 1/2018 | Grady et al. | |
| 2018/0097840 A1 | 4/2018 | Murthy | |
| 2018/0124082 A1 | 5/2018 | Siadati et al. | |
| 2019/0286832 A1* | 9/2019 | Szeto | H04W 12/082 |
| 2019/0318115 A1* | 10/2019 | Holt | G06F 21/6218 |

OTHER PUBLICATIONS

Hardt, "The OAuth 2.0 Authorization Framework," Internet Engineering Task Force (IETF), Oct. 2012, 77 pages. https://tools.ietf.org/html/rfc6749#section-.

Lodderstedt et al., "OAuth 2.0 Security Best Current Practice," Web Authorization Protocol, Apr. 5, 2020, 47 pages. https://tools.ietf.org/html/draft-ietf-oauth-security-topics-15.

* cited by examiner ns in accordance with an
DETECTION OF COMPROMISED CREDENTIALS

BACKGROUND

The disclosure relates generally to network security and, more specifically to detecting compromised credentials corresponding to a client to prevent unauthorized access to protected resources hosted by resource servers connected to a network.

Identity and access management (IAM) is a framework of processes, policies, and technologies that facilitates the management of digital identities. An IAM framework can control user access to protected resources (e.g., data, documents, files, software, hardware, services, and the like) corresponding to an entity, such as, for example, an enterprise, business, company, organization, institution, agency, or the like. IAM systems can be deployed on-premises, provided by a third-party vendor through a cloud-based subscription model, or deployed in a hybrid model. Typical systems used for IAM include single sign-on systems, two-factor authentication, multifactor authentication, privileged access management, and token-based authorization.

Token-based authentication (e.g., OAuth 2.0) is a protocol that allows users to verify their identity and, in return receive a unique access token. During the lifetime of an access token (i.e., a defined period of time), users can access a protected resource, such as a cloud service, for which the access token has been issued for. First, a user requests access to the protected resource. That may involve a login with credentials, such as username and password. Typically, the authorization server determines whether the user should have access by, for example, comparing the received credentials with stored credentials corresponding to the user. After credential authentication or verification, the authorization server issues the access token to the user.

SUMMARY

According to one illustrative embodiment, a computer-implemented method for managing client access token requests is provided. A computer determines whether a current time interval between a last allowed access token request matches a regular access token request interval for a client. In response to the computer determining that the current time interval does match the regular access token request interval for the client, the computer allows a current access token request. The computer generates an access token for the client to access a protected resource hosted by a resource server based on allowing the current access token request. The computer issues the access token to the client via a network. According to other illustrative embodiments, a computer system and computer program product for managing client access token requests are provided.

DETAILED DESCRIPTION

Figure 1:
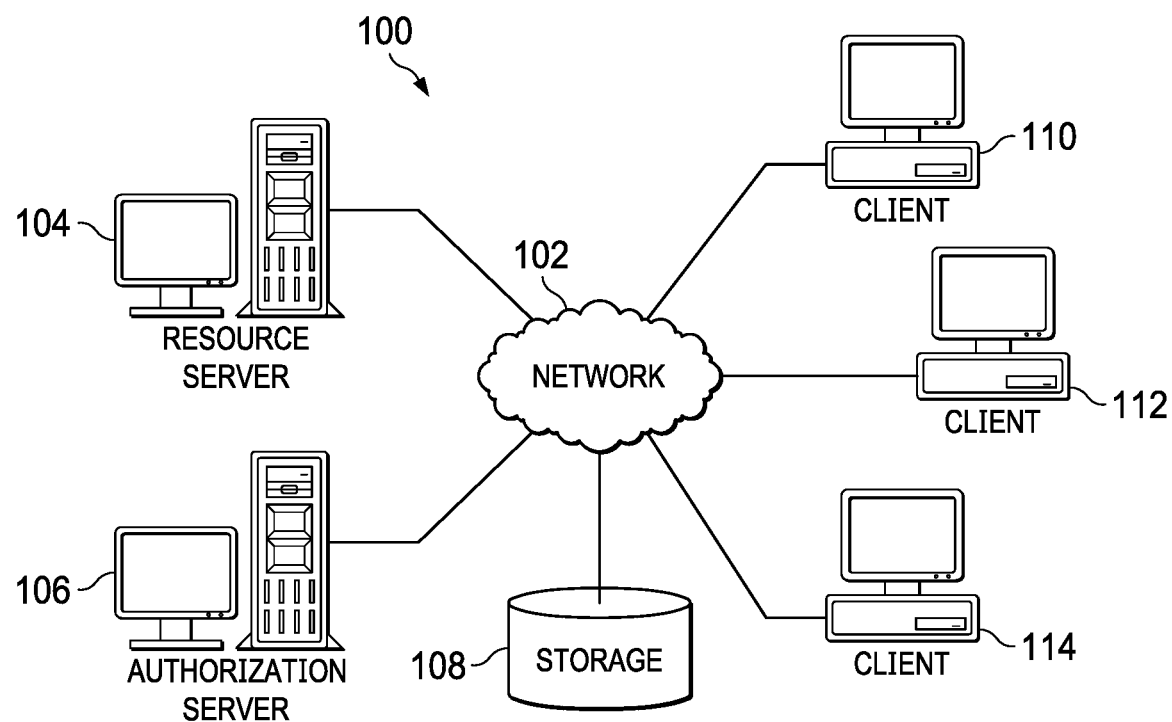
FIG. 1 is a pictorial representation of a network of data processing systems in which illustrative embodiments may be implemented.

The present disclosure may be a system, a method, and/or a computer program product at any possible technical detail level of integration. The computer program product may include a computer-readable storage medium (or media) having computer readable program instructions thereon for causing a processor to carry out aspects of the present disclosure.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer, and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other devices to cause a series of operational steps to be performed on the computer, other programmable apparatus or other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
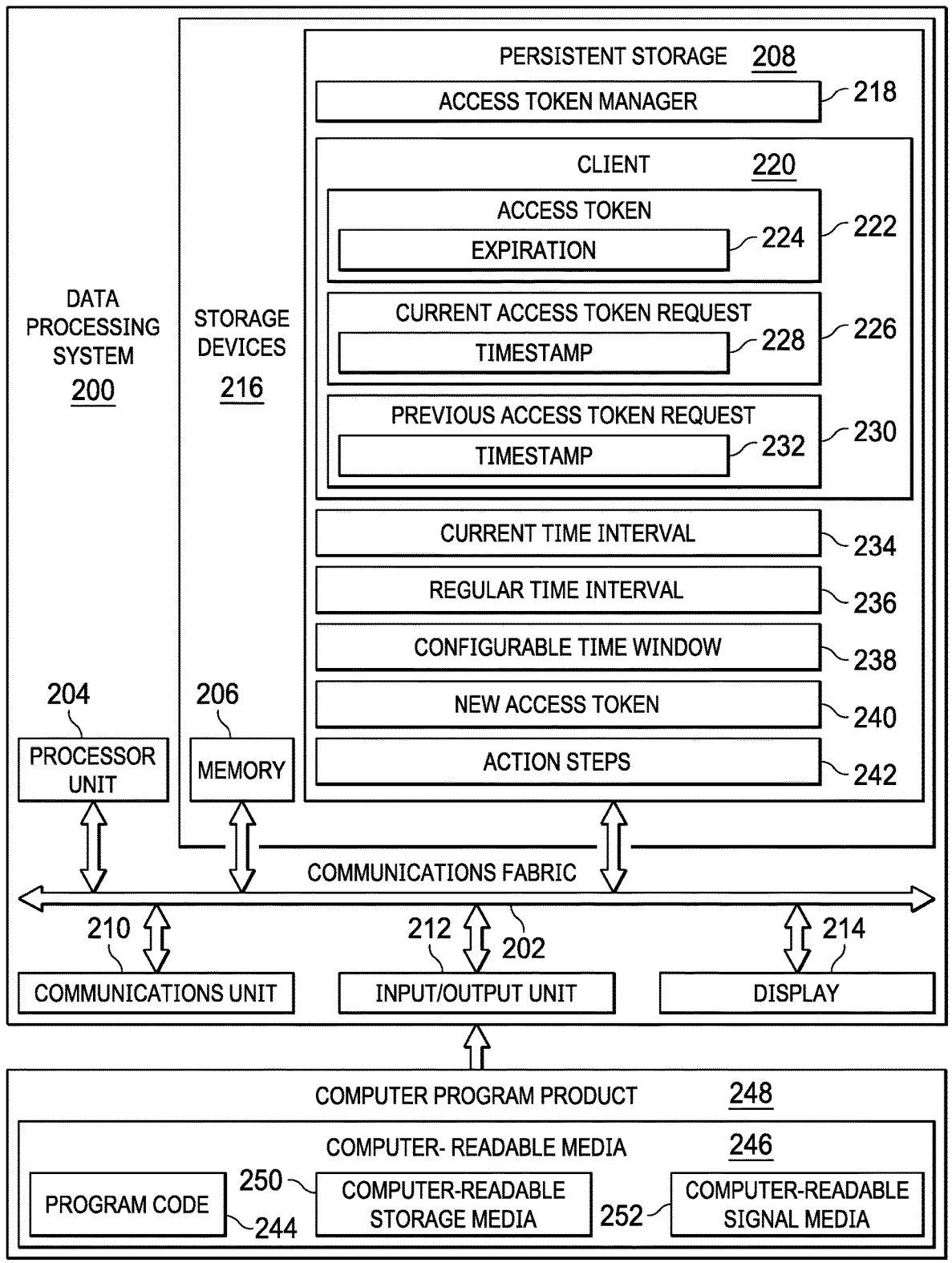
FIG. 2 is a diagram of a data processing system in which illustrative embodiments may be implemented.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation regarding the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, resource server 104 and authorization server 106 connect to network 102, along with storage 108. Resource server 104 and authorization server 106 may be, for example, server computers with high-speed connections to network 102. Also, it should be noted that resource server 104 and authorization server 106 may each represent multiple computing nodes in one or more cloud environments managed by one or more entities. Alternatively, resource server 104 and authorization server 106 may each represent one or more clusters of servers in one or more data centers.

Resource server 104 hosts a set of protected resources. The set of protected resources may include, for example, at least one of data, documents, files, software, hardware, services, and the like. Resource server 104 is capable of accepting and responding to protected resource access requests from client devices using access tokens. Access tokens contain client identifiers for network sessions and identify protected resource access privileges.

Authorization server 106 issues the access tokens to the client devices after successfully authenticating credentials corresponding to the client devices. Furthermore, authorization server 106 detects when client credentials have been compromised, preventing unauthorized access to the set of protected resources hosted by the resource server 104 by determining whether a current access token request was performed by a client within a regular time interval for such client access token requests. The regular time interval is an expected interval of time by authorization server 106 to receive the access token request from the client within a configurable time window of the error to account for network jitter and the like. If the client does not perform the access token request at the expected interval of time (i.e., a consistent, regular time interval), then authorization server 106 denies the access token request, determines that client credentials have been compromised, and notifies the client owner or administrator regarding the compromised credentials for appropriate action. In addition, the authorization server 106 instructs resource server 104 to deny access to the set of protected resources by the client. If the client does perform the access token request at the expected regular interval of time, then authorization server 106 allows the access token request, generates the access token for the client, issues the access token to the client to access the set of protected resources hosted by the resource server 104, and instructs resource server 104 to grant access to the set of protected resources by the client.

Client 110, client 112, and client 114 also connect to network 102. Clients 110, 112, and 114 are clients of resource server 104. In this example, clients 110, 112, and 114 are shown as desktop or personal computers with wire communication links to network 102. However, it should be noted that clients 110, 112, and 114 are examples only and may represent other types of data processing systems, such as, for example, network computers, laptop computers, handheld computers, smartphones, smartwatches, smart televisions, smart vehicles, smart glasses, smart appliances, gaming devices, kiosks, and the like, with wired or wireless communication links to network 102. Users of clients 110, 112, and 114 may utilize specific web applications loaded on clients 110, 112, and 114 to access corresponding protected resources hosted by the resource server 104 using access tokens from the authorization server 106 after successful authentication and authorization by authorization server 106.

Storage 108 is a network storage device capable of storing any type of data in a structured format or an unstructured format. In addition, storage 108 may represent a plurality of network storage devices. Further, storage 108 may store identifiers, and network addresses for a plurality of resource servers, identifiers, and network addresses for a plurality of client devices, identifiers for a plurality of client device users, and the like. Furthermore, storage 108 may store other types of data, such as credential data that may include usernames, passwords, and biometric data associated with the client device users, for example.

In addition, it should be noted that network data processing system 100 may include any number of additional servers, clients, storage devices, and other devices not shown. Program code located in network data processing system 100 may be stored on a computer-readable storage medium or a set of computer-readable storage media and downloaded to a computer or other data processing device for use. For example, program code may be stored on a computer-readable storage medium on resource server 104 and downloaded to client 110 over network 102 for use on client 110.

In the depicted example, network data processing system 100 may be implemented as a number of different types of communication networks, such as, for example, an internet, an intranet, a wide area network (WAN), a local area network (LAN), a telecommunications network, or any combination thereof. FIG. 1 is intended as an example only and not as an architectural limitation for the different illustrative embodiments.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

With reference now to FIG. 2, a diagram of a data processing system is depicted in accordance with an illustrative embodiment. Data processing system 200 is an example of a computer, such as authorization server 106 in FIG. 1, in which computer-readable program code or instructions implementing the access token management processes of illustrative embodiments may be located. In this example, the data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. As used herein, a computer-readable storage device or a computer-readable storage medium is any piece of hardware that is capable of storing information, such as, for example, without limitation, data, computer-readable program code in functional form, and/or other suitable information either on a transient basis or a persistent basis. Further, a computer-readable storage device or a computer-readable storage medium excludes a propagation medium, such as transitory signals. Furthermore, a computer-readable storage device or a computer-readable storage medium may represent a set of computer-readable storage devices or a set of computer-readable storage media. Memory 206, in these examples, may be, for example, a random-access memory (RAM) or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores access token manager 218. However, it should be noted that even though access token manager 218 is illustrated as residing in persistent storage 208, in an alternative illustrative embodiment, access token manager 218 may be a separate component of the data processing system 200. For example, access token manager 218 may be a hardware component coupled to communication fabric 202 or a combination of hardware and software components.

Access token manager 218 controls the process of detecting compromised client credentials to prevent unauthorized access to protected resources hosted by one or more resource servers connected to a network, such as, for example, network 102 in FIG. 1. Client 220 represents an identifier of an authorized client, such as, for example, client 110 in FIG. 1. Client 220 utilizes access token 222 to access a set of protected resources of a resource server, such as, for example, resource server 104 in FIG. 1.

Access token manager 218 issued access token 222 to client 220 after allowing a previous access token request performed by client 220 upon verification of credentials presented by client 220. Access token 222 has a fixed lifetime (i.e., expiration 224). Expiration 224 defines a time when access token 222 is no longer valid or usable to access the set of protected resources hosted by the resource server. Access token manager 218 informed client 220 of expiration 224 upon issuance of access token 222 so that client 220 knows when access token 222 will expire.

At expiration 224 or at a time just prior to expiration 224 within a client-defined time threshold, client 220 performs current access token request 226. Access token manager 218 receives current access token request 226 and notes timestamp 228 of current access token request 226. Timestamp 228 represents when client 220 performed current access token request 226. Previous access token request 230 represents the allowed access token request performed by client 220 above to receive access token 222. Timestamp 232, which was recorded by access token manager 218, corresponds to when client 220 performed previous access token request 230.

Access token manager 218 retrieves timestamp 232 corresponding to previous access token request 230 and compares timestamp 232 with timestamp 228, which corresponds to current access token request 226, to determine the current time interval 234. The current time interval 234 represents the span of time between the performance of previous access token request 230 and the performance of current access token request 226 by client 220. Current time interval 234 may be "N" number of seconds, minutes, hours, days, or the like.

In addition, access token manager 218 retrieves regular time interval 236. Regular time interval 236 is a consistent period of time that elapses between each respective access token request performed by client 220. Access token manager 218 previously determined regular time interval 236 based on one or more previously performed access token requests by client 220 and expects the time interval between access token requests performed by client 220 to be the same or substantially the same within configurable time window 238. Configurable time window 238 is an adjustable period of time, which allows for network transmission issues, such as, for example, jitter, latency, and the like. Access token manager 218 may automatically adjust configurable time window 238. Alternatively, a network administrator, for example, may manually adjust configurable time window 238.

Access token manager 218 compares the current time interval 234 with the regular time interval 236. If access token manager 218 determines that current time interval 234 matches regular time interval 236 within configurable time window 238 based on the comparison, then access token manager 218 allows current access token request 226, generates new access token 240, issues a new access token 240 to client 220, and instructs the resource server to grant access to the set of protected resources by client 220. The client then uses the new access token 240 to continue to access the set of resources hosted by the resource server. However, if access token manager 218 determines that current time interval 234 does not match regular time interval 236 within configurable time window 238 based on the comparison, then access token manager 218 determines that credentials corresponding to client 220 have been compromised, denies current access token request 226, and automatically performs action steps 242. Action steps 242 may include, for example, at least one of sending a notification to an owner or administrator of client 220 that current access token request 226 has been denied, instructing the resource server to deny access to the set of resources by client 220, locking client 220, revoking access tokens issued to client 220, disabling all access tokens corresponding to client 220, notifying network security, and the like.

As a result, the data processing system 200 operates as a special purpose computer system in which access token manager 218 in the data processing system 200 enables management of access token issuance by detecting compromised client credentials to prevent unauthorized access to protected network resources. In particular, access token manager 218 transforms data processing system 200 into a special purpose computer system as compared to currently available general computer systems that do not have access token manager 218.

Communications unit 210, in this example, provides for communication with other computers, data processing systems, and devices via a network, such as a network 102 in FIG. 1. Communications unit 210 may provide communications using both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to the data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer-readable program code that may be read and run by a processor in processor unit 204. The program instructions, in the different embodiments, may be embodied on different physical computer-readable storage devices, such as memory 206 or persistent storage 208.

Program code 244 is located in a functional form on computer-readable media 246 that is selectively removable and may be loaded onto or transferred to the data processing system 200 for running by processor unit 204. Program code 244 and computer-readable media 246 form computer program product 248. In one example, computer-readable media 246 may be computer-readable storage media 250 or computer-readable signal media 252.

In these illustrative examples, computer-readable storage media 250 is a physical or tangible storage device used to store program code 244 rather than a medium that propagates or transmits program code 244. Computer-readable storage media 250 may include, for example, an optical or magnetic disc that is inserted or placed into a drive or other device that is part of persistent storage 208 for transfer onto a storage device, such as a hard drive, that is part of persistent storage 208. Computer-readable storage media 250 also may take the form of a persistent storage, such as a hard drive, a thumb drive, or a flash memory that is connected to data processing system 200.

Alternatively, program code 244 may be transferred to the data processing system 200 using computer-readable signal media 252. Computer-readable signal media 252 may be, for example, a propagated data signal containing program code 244. For example, computer-readable signal media 252 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer-readable media 246" can be singular or plural. For example, program code 244 can be located in computer-readable media 246 in the form of a single storage device or system. In another example, program code 244 can be located in computer-readable media 246 that is distributed in multiple data processing systems. In other words, some instructions in program code 244 can be located in one data processing system, while other instructions in program code 244 can be located in one or more other data processing systems. For example, a portion of program code 244 can be located in computer-readable media 246 in a server computer, while another portion of program code 244 can be located in computer-readable media 246 located in a set of client computers.

The different components illustrated for data processing system 200 are not meant to provide architectural limitations to the manner in which different embodiments can be implemented. In some illustrative examples, one or more of the components may be incorporated in or otherwise form a portion of another component. For example, memory 206, or portions thereof, may be incorporated in processor unit 204 in some illustrative examples. The different illustrative embodiments can be implemented in a data processing system, including components in addition to or in place of those illustrated for data processing system 200. Other components shown in FIG. 2 can be varied from the illustrative examples shown. The different embodiments can be implemented using any hardware device or system capable of running program code 244.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

OAuth 2.0 clients make use of a shared secret between the client (e.g., web application) and authorization server for authorization to access protected resources hosted by a resource server. The application programming interface (API) endpoints of the authorization server may be, for example, /token, /introspect, /revoke, and the like. These API endpoints of the authorization server can support a variety of authorization methods, such as, for example, JSON web token assertions, client certificates, access tokens, basic authentication, POST parameters, and the like. However, these methods vary in complexity, from the simplest, such as basic authentication and POST parameters, which just requires the client to present client credentials, to more complex methods where a cryptography certificate is used, or an assertion is created by the client. These more complex methods require increased effort, which is sometimes non-trivial for OAuth 2.0 clients to provide, such as creating signed assertions or managing certificate information. This increased complexity can be undesirable to owners and administrators of such clients.

Protecting the client's secret of a client is important for preventing unauthorized access to protected resources (i.e., maintaining the security of protected resources). Illustrative embodiments detect when client credentials have been compromised (e.g., misappropriated) and are being used by an unauthorized (e.g., malicious) user trying to access a protected resource (e.g., a service) using the compromised client credentials. Illustrative embodiments secure environments that utilize access tokens as an authorization method when calling authorization server API endpoints for authorization to access protected resources hosted by resource servers. An access token is shared among the authorization server, the resource server the access token is valid for, and the client the access token is issued to.

A client obtains an access token from an authorization server by making a client access token grant type request for the access token. The result of a successful access token request (i.e., providing valid credentials, such as, for example, correct username and password, to the authorization server) by a client is an access token having a fixed lifetime (i.e., a defined time when the access token expires and is no longer valid or usable), which the client can use to access a protected resource hosted by the resource server, along with the authorization server API endpoints mentioned above. The authorization server sets the fixed lifetime (i.e., expiration) of the access token and informs the client of the fixed lifetime so that the client knows when the access token will expire and become invalid. In one illustrative embodiment, the authorization server sets expiration for the fixed lifetime of all access tokens the same for every client. In an alternative illustrative embodiment, the authorization server sets a different expiration for access tokens for each different client.

Because of the known expiration (i.e., fixed lifetime) of an access token, the authorization server can predict the regularity of, or time interval between, access token requests by a client. The authorization server leverages this expected pattern of access token requests by a client to detect deviations from this expected pattern of client behavior, which is indicative of an invalid or unauthorized access token request (i.e., compromised credentials).

Illustrative embodiments can be utilized by an entity, such as, for example, an enterprise, company, business, organization, institution, agency, or the like, that has authorization policies requiring a client to utilize an access token to access any of the entity's authorization server API endpoints. For a client to access these authorization API endpoints, the client must perform an access token request with the authorization server at regular or consistent time intervals (i.e., at substantially the same interval of time within a configurable window of time (e.g., five seconds) to allow for network delays caused by, for example, jitter). The regular interval is attained via the client running logic or a thread in the background that generates a new access token request when the expiration of a current access token is approaching within a client-defined threshold period of time. For example, an application developer creates a web application with the logic that generates an access token request every "N" time interval, where N is a number of seconds, minutes, hours, or the like. Alternatively, the regular interval is attained via the client having the load at such a level that when an access token is approaching its expiration, the client performs a new access token request within a defined timeout (e.g., the client is invoked every five seconds with regular load).

A client using either of these mechanisms above will perform an access token request at the regular time interval (i.e., an expected interval of time by the authorization server). Consequently, the authorization server tracks when a client performs an access token request and determines whether the access token request falls within the expected or historical pattern of access token requests by the client. In other words, the authorization server correlates the current client access token request with one or more historical or past client access token requests and evaluates the regularity of, or the time interval between, these client access token requests to ensure that the current client access token request falls within the expected pattern of access token requests, allowing for the configurable window of time for the client to request the access token within and how close (i.e., within a client-defined threshold) to the expiration of the current access token the client is willing to use the current access token (e.g., the fixed lifetime of thirty seconds). In addition, the authorization server may also utilize other pieces of information corresponding to the access token request, such as, for example, the IP address of the client, to establish different instances of that client requesting access tokens.

If the authorization server determines that a client access token request deviates from the expected pattern of client access token request behavior, then the authorization server considers the current access token request as an invalid (e.g., illegitimate) access token request. The authorization server tags the current access token request as invalid and sends a notification to the client owner or administrator that client credentials have been compromised and to take appropriate action. The authorization server may also automatically perform one or more other action steps, such as, for example, instruct the resource server to deny access to protected resources by the client, lock the client, disable access tokens corresponding to the client, and the like.

Thus, illustrative embodiments can detect when client credentials have been compromised (e.g., misappropriated) and are being used by an unauthorized client to try to access a protected resource using the compromised client credentials. Illustrative embodiments detect when client credential have been compromised by enforcing a specific time interval at which a client must exchange credentials for an access token. In other words, illustrative embodiments measure the time interval between client access token requests and enforce that specific time interval. Currently, no solutions exist that can detect unauthorized protected resource access by leveraging expected patterns of client access token requests to determine when compromised client credentials are being used.

Therefore, illustrative embodiments provide one or more technical solutions that overcome a technical problem with detecting when compromised client credentials are being used by unauthorized users to access protected resources connected to a network. As a result, these one or more technical solutions provide a technical effect and practical application in the field of network security.

Figure 3:
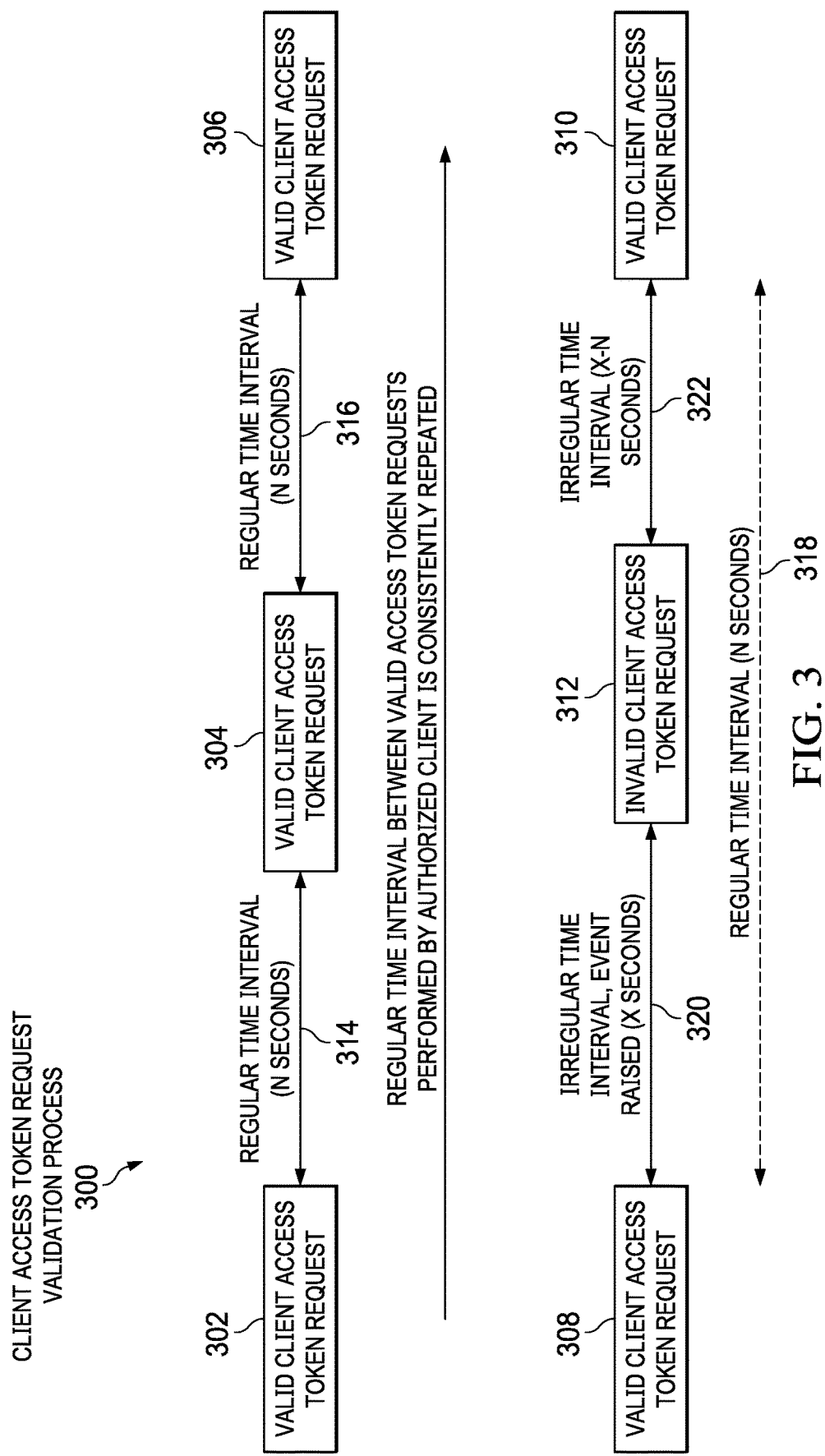
FIG. 3 is a diagram illustrating an example of client access token request validation in accordance with an illustrative embodiment.

With reference now to FIG. 3, a diagram illustrating an example of client access token request validation is depicted in accordance with an illustrative embodiment. Client access token request validation process 300 may be implemented in a computer, such as, for example, the authorization server 106 in FIG. 1 or data processing system 200 in FIG. 2.

In this example, client access token request validation process 300 includes valid client access token request 302, valid client access token request 304, valid client access token request 306, valid client access token request 308, valid client access token request 310, and invalid client access token request 312. However, it should be noted that client access token request validation process 300 is intended as an example only and not as a limitation on illustrative embodiments. In other words, client access token request validation process 300 may include any number of valid and invalid client access token requests.

A client, such as, for example, client 110 in FIG. 1, performs valid client access token requests 302, 304, 306, 308, and 310. In other words, the client is an authorized client. Another client, such as, for example, client 112 in FIG. 1, performs invalid client access token request 312. In other words, the other client is an unauthorized client.

The authorization server allows valid client access token requests 302, 304, 306, 308, and 310 performed by the client based on a regular time interval 314 between valid client access token request 302 and valid client access token request 304, regular time interval 316 between valid client access token request 304 and valid client access token request 306, and regular time interval 318 between valid client access token request 308 and valid client access token request 310. In this example, regular time intervals 314, 316, 318 are each "N" number of seconds in length. However, it should be noted that regular time intervals 314, 316, 318 may be measured in minutes, hours, days, or the like instead of seconds. Regular time intervals 314, 316, 318 are consistent spans of time between each respective valid client access token request and may be, for example, the regular time interval 236 in FIG. 2. In other words, the regular time interval between access token requests performed by the authorized client is consistently repeated. As a result, the authorization server issues a new access token to the authorized client after each valid access token request based on the access token requests being performed at the regular time interval.

Because the other client performed invalid client access token request 312 at an irregular time interval 320 (i.e., "X" number of seconds between access token requests instead of "N" number of seconds corresponding to the regular time interval for the client), the authorization server raises an event and denies invalid client access token request 312 performed by the other client. As a result, the authorization server detects compromised credentials corresponding to the client and notifies, for example, an owner or administrator of the client regarding the compromised credentials. Further, because the other client performed invalid client access token request 312 at "X" number of seconds to produce irregular time interval 320, the irregular time interval 322 (i.e., "X−N" number of seconds is produced between invalid client access token request 312 and valid client access token request 310.

Figure 4A:
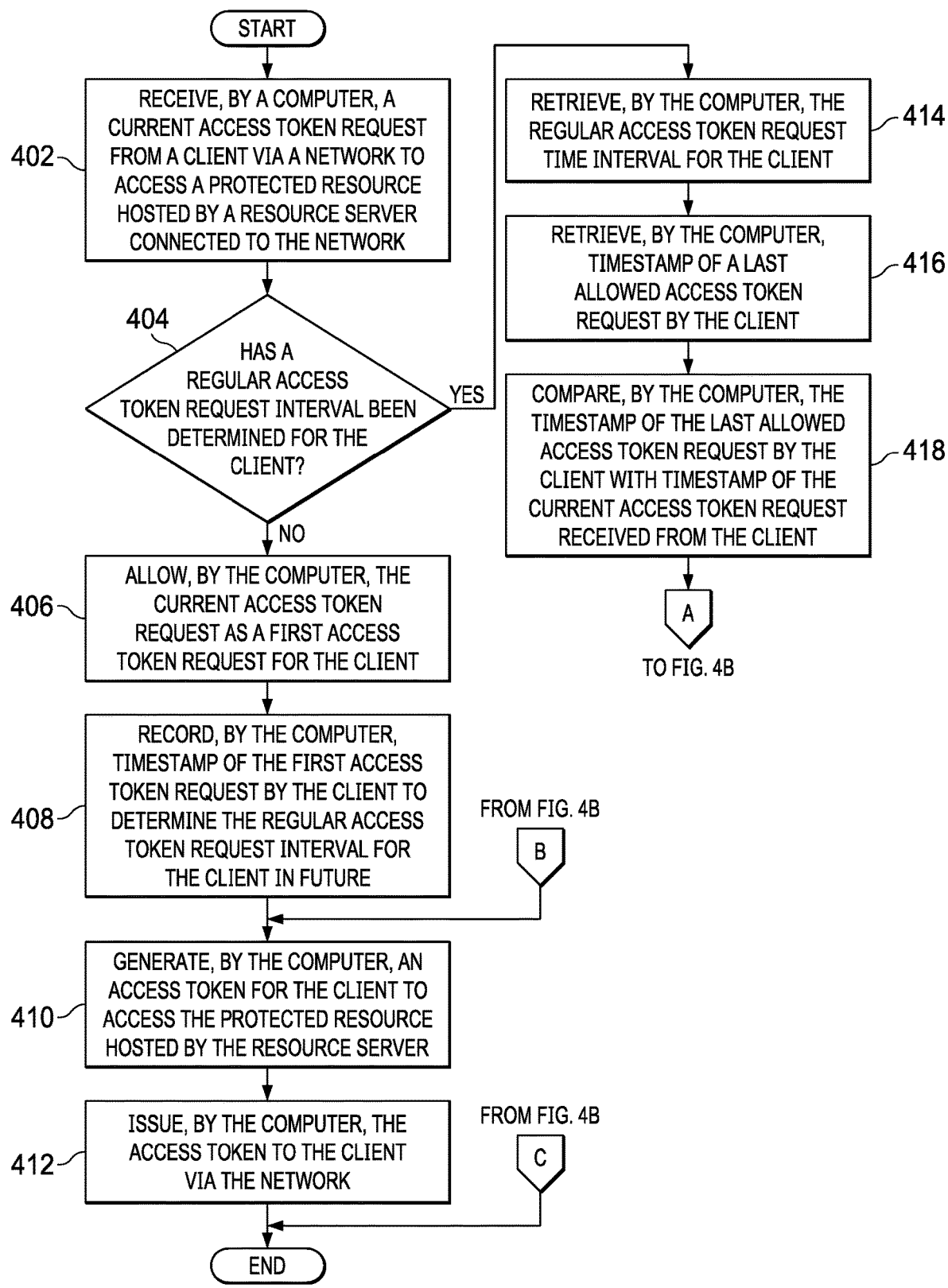
FIGS. 4A-4B are a flowchart illustrating a process for managing client access token requests in accordance with an illustrative embodiment.
Figure 4B:
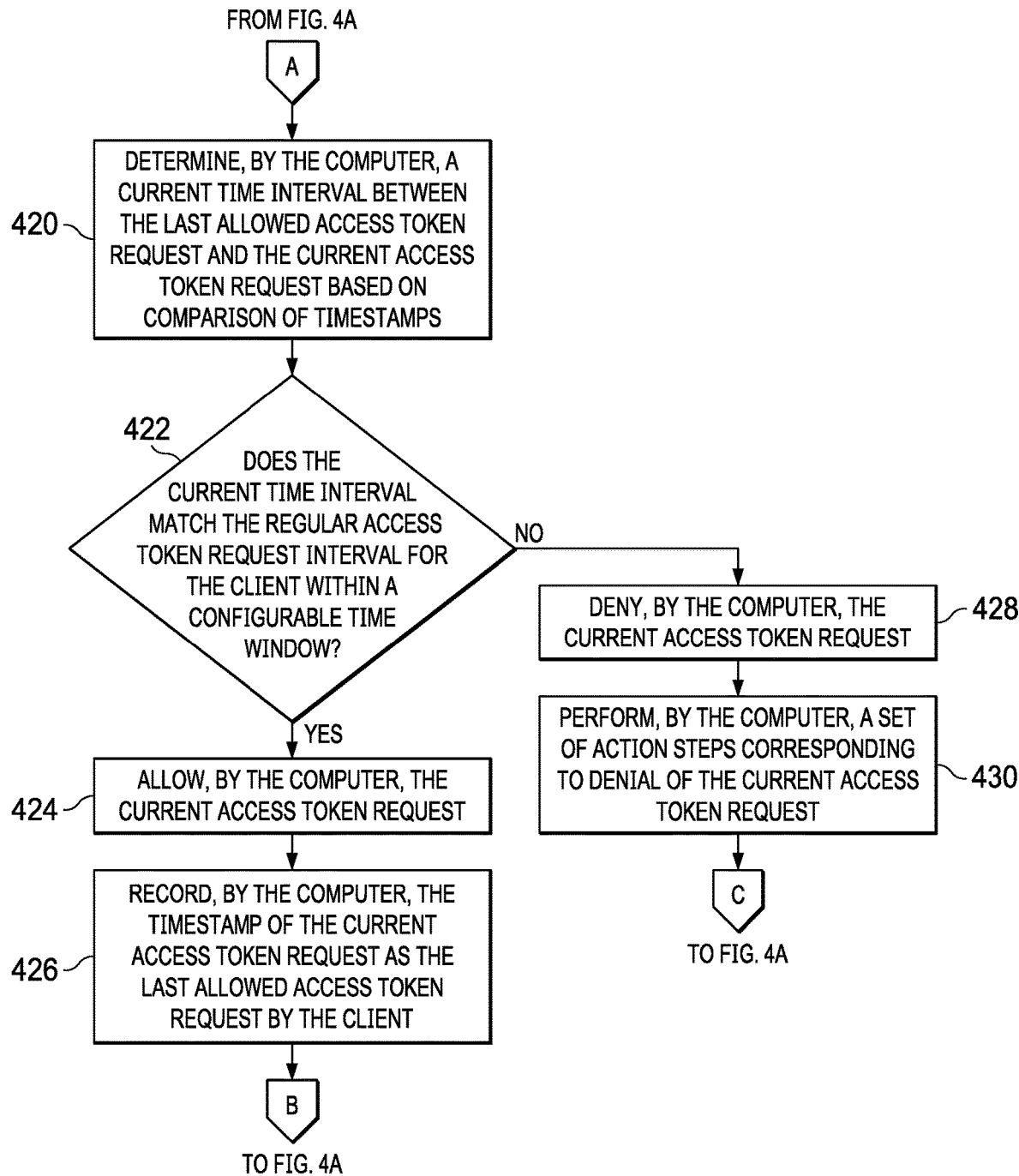

With reference now to FIGS. 4A-4B, a flowchart illustrating a process for managing client access token requests is shown in accordance with an illustrative embodiment. The process shown in FIGS. 4A-4B may be implemented in a computer, such as, for example, the authorization server 106 in FIG. 1 or data processing system 200 in FIG. 2. For example, the process shown in FIGS. 4A-4B may be implemented in access token manager 218 in FIG. 2.

The process begins when the computer receives a current access token request from a client via a network to access a protected resource hosted by a resource server connected to the network (step 402). In response to receiving the current access token request from the client, the computer makes a determination as to whether a regular access token request interval has been determined for the client (step 404).

If the computer determines that a regular access token request interval has not been determined for the client, no output of step 404, then the computer allows the current access token request as a first access token request for the client (step 406). The computer also records a timestamp of the first access token request by the client to determine the regular access token request interval for the client in future (step 408). In addition, the computer generates an access token for the client to access the protected resource hosted by the resource server (step 410). Further, the computer issues the access token to the client via the network (step 412). Thereafter, the process terminates.

Returning to step 404, if the computer determines that a regular access token request interval has been determined for the client, yes output of step 404, then the computer retrieves the regular access token request time interval for the client (step 414). The computer also retrieves a timestamp of the last allowed access token request by the client (step 416). The computer compares the timestamp of the last allowed access token request by the client with a timestamp of the current access token request received from the client (step 418). The computer determines a current time interval between the last allowed access token request and the current access token request based on a comparison of timestamps (step 420). Afterward, the computer makes a determination as to whether the current time interval matches the regular access token request interval for the client within a configurable time window (step 422).

If the computer determines that the current time interval does match the regular access token request interval for the client within the configurable time window, yes output of step 422, then the computer allows the current access token request (step 424). In addition, the computer records the timestamp of the current access token request as the last allowed access token request by the client in response to allowing the current access token request (step 426). Thereafter, the process returns to step 410, where the computer generates an access token for the client based on allowing the current access token request.

Returning to step 422, if the computer determines that the current time interval does not match the regular access token request interval for the client within the configurable time window, no output of step 422, then the computer denies the current access token request (step 428) and determines that credentials corresponding to the client have been compromised. Further, the computer automatically performs a set of action steps corresponding to denial of the current access token request (step 430). Thereafter, the process terminates.

Thus, illustrative embodiments of the present disclosure provide a computer-implemented method, computer system, and computer program product for detecting compromised client credentials to prevent unauthorized access to protected resources hosted by resource servers connected to a network. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for managing client access token requests, the computer-implemented method comprising:
   determining, by a computer, whether a current time interval between a last allowed access token request matches a regular access token request interval for a client;
   responsive to the computer determining that the current time interval does match the regular access token request interval for the client, allowing, by the computer, a current access token request;
   generating, by the computer, an access token for the client to access a protected resource hosted by a resource server based on allowing the current access token request;
   issuing, by the computer, the access token to the client via a network;
   responsive to the computer determining that the regular access token request interval has been determined for the client, retrieving, by the computer, the regular access token request interval for the client;
   retrieving, by the computer, a timestamp of the last allowed access token request by the client;
   comparing, by the computer, the timestamp of the last allowed access token request by the client with a timestamp of the current access token request received from the client; and
   determining, by the computer, the current time interval between the last allowed access token request and the current access token request based on comparison of timestamps.

2. The computer-implemented method of claim 1 further comprising:
   responsive to the computer determining that the current time interval does not match the regular access token request interval for the client, denying, by the computer, the current access token request; and
   performing, by the computer, a set of action steps corresponding to denial of the current access token request.

3. The computer-implemented method of claim 1 further comprising:
   receiving, by the computer, the current access token request from the client via the network to access the protected resource hosted by the resource server connected to the network; and
   determining, by the computer, whether the regular access token request interval has been determined for the client in response to receiving the current access token request from the client.

4. The computer-implemented method of claim 3 further comprising:
   responsive to the computer determining that the regular access token request interval has not been determined for the client, allowing, by the computer, the current access token request as a first access token request for the client; and
   recording, by the computer, a timestamp of the first access token request by the client to determine the regular access token request interval for the client in future.

5. The computer-implemented method of claim 1 further comprising:

recording, by the computer, a timestamp of the current access token request as the last allowed access token request by the client in response to allowing the current access token request.

6. The computer-implemented method of claim 1, wherein the computer determines whether the current time interval between the last allowed access token request matches the regular access token request interval for the client within a configurable time window that allows for network transmission issues.

7. The computer-implemented method of claim 1, wherein the regular access token request interval for the client is a period of time that elapses between each respective access token request performed by the client.

8. The computer-implemented method of claim 1, wherein the regular access token request interval for the client is attained via the client running logic that generates a new access token request when expiration of a current access token is approaching within a client-defined threshold period of time.

9. The computer-implemented method of claim 8, wherein the computer sets the expiration of access tokens the same for the client.

10. A computer system for managing client access token requests, the computer system comprising:
a bus system;
a storage device connected to the bus system, wherein the storage device stores program instructions; and
a processor connected to the bus system, wherein the processor executes the program instructions to:
determine whether a current time interval between a last allowed access token request matches a regular access token request interval for a client;
allow a current access token request in response to determining that the current time interval does match the regular access token request interval for the client;
generate an access token for the client to access a protected resource hosted by a resource server based on allowing the current access token request;
issue the access token to the client via a network;
retrieve the regular access token request interval for the client in response to determining that the regular access token request interval has been determined for the client;
retrieve a timestamp of the last allowed access token request by the client;
compare the timestamp of the last allowed access token request by the client with a timestamp of the current access token request received from the client; and
determine the current time interval between the last allowed access token request and the current access token request based on comparison of timestamps.

11. The computer system of claim 10, wherein the processor further executes the program instructions to:
deny the current access token request in response to determining that the current time interval does not match the regular access token request interval for the client; and
perform a set of action steps corresponding to denial of the current access token request.

12. The computer system of claim 10, wherein the processor further executes the program instructions to:
receive the current access token request from the client via the network to access the protected resource hosted by the resource server connected to the network; and
determine whether the regular access token request interval has been determined for the client in response to receiving the current access token request from the client.

13. The computer system of claim 12, wherein the processor further executes the program instructions to:
allow the current access token request as a first access token request for the client in response to determining that the regular access token request interval has not been determined for the client; and
record a timestamp of the first access token request by the client to determine the regular access token request interval for the client in future.

14. A computer program product for managing client access token requests, the computer program product comprising a computer readable storage medium having program instructions embodied therewith, the program instructions executable by a computer to cause the computer to perform a method of:
determining, by the computer, whether a current time interval between a last allowed access token request matches a regular access token request interval for a client;
responsive to the computer determining that the current time interval does match the regular access token request interval for the client, allowing, by the computer, a current access token request;
generating, by the computer, an access token for the client to access a protected resource hosted by a resource server based on allowing the current access token request;
issuing, by the computer, the access token to the client via a network;
responsive to the computer determining that the regular access token request interval has been determined for the client, retrieving, by the computer, the regular access token request interval for the client;
retrieving, by the computer, a timestamp of the last allowed access token request by the client;
comparing, by the computer, the timestamp of the last allowed access token request by the client with a timestamp of the current access token request received from the client; and
determining, by the computer, the current time interval between the last allowed access token request and the current access token request based on comparison of timestamps.

15. The computer program product of claim 14 further comprising:
responsive to the computer determining that the current time interval does not match the regular access token request interval for the client, denying, by the computer, the current access token request; and
performing, by the computer, a set of action steps corresponding to denial of the current access token request.

16. The computer program product of claim 14 further comprising:
receiving, by the computer, the current access token request from the client via the network to access the protected resource hosted by the resource server connected to the network; and
determining, by the computer, whether the regular access token request interval has been determined for the client in response to receiving the current access token request from the client.

17. The computer program product of claim 16 further comprising:

responsive to the computer determining that the regular access token request interval has not been determined for the client, allowing, by the computer, the current access token request as a first access token request for the client; and recording, by the computer, a timestamp of the first access token request by the client to determine the regular access token request interval for the client in future.

\* \* \* \* \*